United States Patent [19]

Kawai et al.

[11] Patent Number: 4,746,364
[45] Date of Patent: May 24, 1988

[54] FLOWING CONCRETE AND PROCESS OF PRODUCING THE SAME

[75] Inventors: Toru Kawai; Takeji Okada; Gaku Matsumoto, all of Tokyo, Japan

[73] Assignee: Shimizu Construction Co., Ltd., Japan

[21] Appl. No.: 883,916

[22] Filed: Jul. 10, 1986

[30] Foreign Application Priority Data

Jul. 12, 1985 [JP]  Japan ................... 60-153818

[51] Int. Cl.[4] .............. C04B 24/10; C04B 24/30
[52] U.S. Cl. ........................... 106/90; 106/93; 106/314; 524/4; 524/5; 524/6
[58] Field of Search ............ 106/90, 93, 314; 166/293; 524/4, 5, 6

[56] References Cited

U.S. PATENT DOCUMENTS

| | | | |
|---|---|---|---|
| 3,030,258 | 4/1962 | Wagner | 106/90 |
| 4,069,062 | 1/1978 | Burge | 106/93 |
| 4,131,480 | 12/1978 | McCurrich et al. | 106/93 |

FOREIGN PATENT DOCUMENTS

| | | | |
|---|---|---|---|
| 52-27425 | 3/1977 | Japan | 106/93 |
| 869217 | 5/1961 | United Kingdom | 106/93 |

OTHER PUBLICATIONS

Handbook of Structural Concrete (1984) pp. 9-14 to 9-19 McGraw Hill Book Co., Kong et al.
Concrete Technology by D. F. Orchard (1973) p. 60.

*Primary Examiner*—Steven Capella
*Attorney, Agent, or Firm*—Scully, Scott, Murphy & Presser

[57] ABSTRACT

A flowing concrete and a process of producing the same. A cement, water, aggregates, a superplasticizer and a segregation-controlling agent are kneaded into a base concrete having a water-cement ratio of about 35% or less, the segregation-controlling agent contained in an amount of about 0.02 to about 0.1 wt. %, based on the water and including a methylcellulose compound, and the superplasticizer contained in an amount of about 0.25 to about 0.6 wt. % based on the cement. Then, about 0.25 to about 0.6 wt. %, in terms of the solid, of a flowing agent based on the cement is added to the base concrete, the flowing agent including a sulfonic acid/formaldehyde high condensate and a polyvinyl alcohol. Further, the base concrete with the flowing agent is kneaded into the flowing concrete.

6 Claims, 3 Drawing Sheets

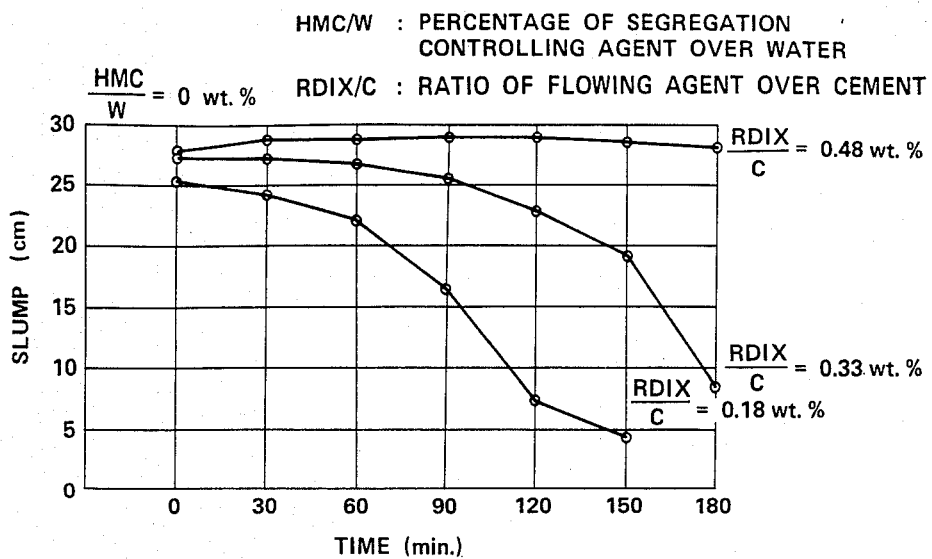
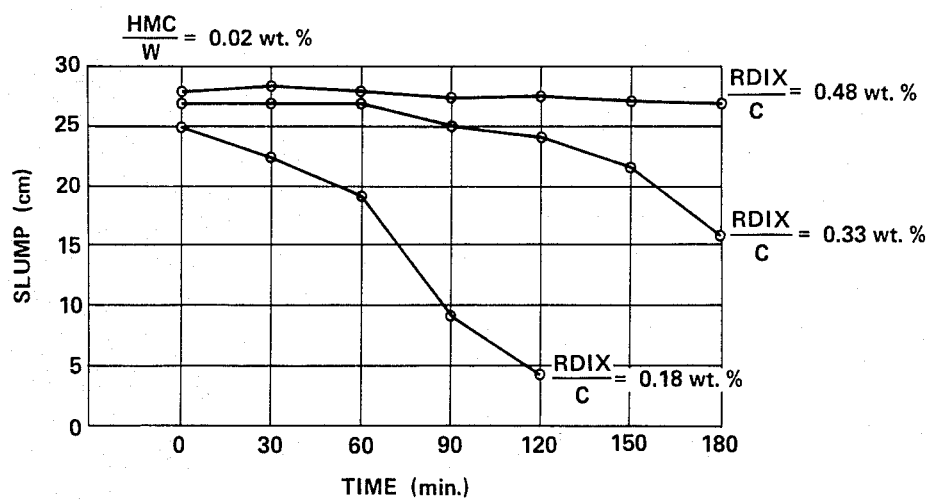

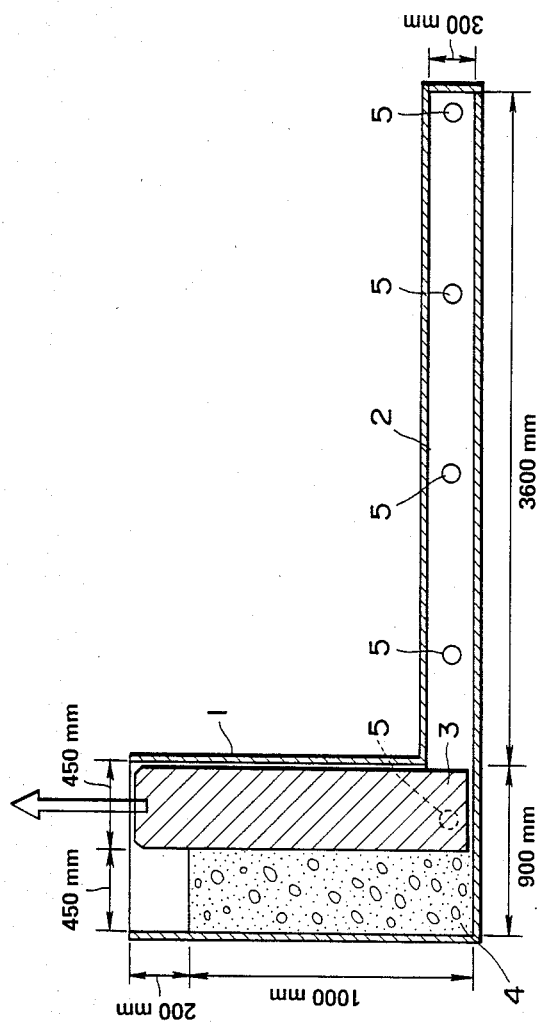

FLOWING CONCRETE AND PROCESS OF PRODUCING THE SAME

The present invention relates to a highly flowing concrete with an improved resistance to segregation of constituent materials and a process of producing the same.

Highly flowing concretes containing a large unit amount of water is well known. However, they have drawbacks in that an increased amount of a cement is necessitated, and in that their dry shrinkage is relatively high. For overcoming these drawbacks, a water-reducing agent is used to reduce the unit amount of water but the high fluidity of flowing concretes cannot be maintained for a long period of time and thus, problems of low workability have not been solved yet. In view of these conditions, a process in which a flowing agent is further added for solving the above-mentioned problems has been proposed. However, even such a concrete composition which contains both the water-reducing agent and the flowing agent has drawbacks in that when the slump is 20 cm or below, the maintenance of the high fluidity for a long period of time becomes difficult, and in that when the slump is 24 cm or above, the segregation of constituent materials such as aggregates becomes serious though a high fluidity can be maintained. Particularly when a concrete is to be poured in a building framework which has a complicated shape or in which reinforcing steels are arranged closely, the concrete must be capable of maintaining such a high fluidity that compaction with a vibrator can be omitted, i.e. a slump of at least 24 cm, for a long period of time and at the same time the constituent materials should not segregate.

Accordingly, it is an object of the present invention to provide a flowing concrete and a process of producing the same in which a relatively high fluidity is maintained for a prolonged period of time, so that compaction in the concrete placement may be omitted.

It is another object of the present invention to provide a flowing concrete and a process of producing the same in which segregation of constituent materials such as aggregates is reduced in spite of a relatively high fluidity, with the result that a hardened concrete with improved quality and strength is obtained.

With these and other objects in view, one aspect of the present invention is directed to a process of producing a flowing concrete. A cement, water, aggregates, a superplasticizer and a segregation-controlling agent are kneaded into a base concrete having a water-cement ratio of about 25% to about 35%, the segregation-controlling agent contained in an amount of about 0.02 to about 0.1 wt. %, based on the water and including a methylcellulose compound, the superplasticizer contained in an amount of about 0.25 to about 0.6 wt. % based on the cement. Then, about 0.25 to about 0.6 wt. %, in terms of the solid, of a flowing agent based on the cement is added to the base concrete, the flowing agent including a sulfonic acid/formaldehyde high condensate and a polyvinyl alcohol. Further, the base concrete with the flowing agent is kneaded into a flowing concrete.

Another aspect of the present invention is directed to a flowing concrete prepared by such a process.

The flowing concrete according to the present invention is useful for the use in buildings, but not limited to such a use.

IN THE DRAWINGS

FIGS. 1 to 3 are graphs illustrating changes with time in the slump of each specimens in Example 1;

FIG. 4 is a diagrammatical vertical section of a test device used in Example 2.

Figure 3:
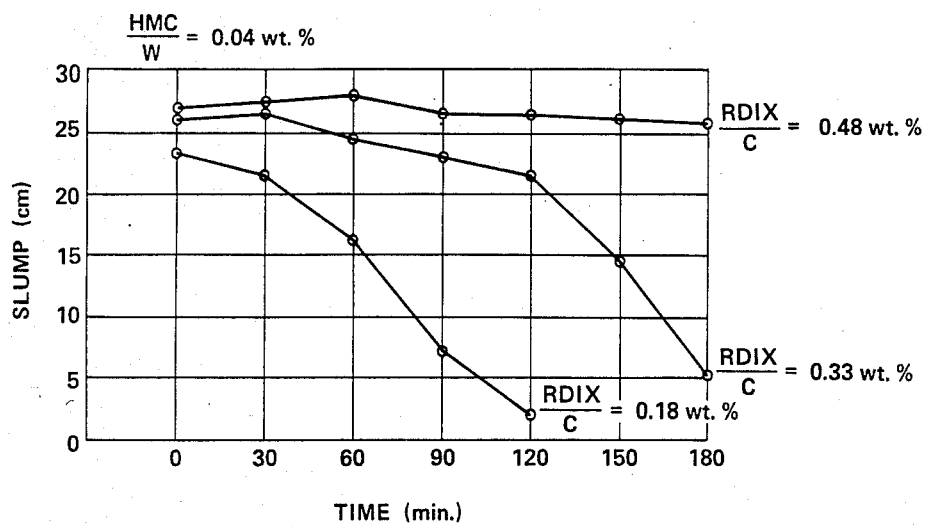

The water-cement ratio of the concrete of the present invention is generally set in the range of about 25% to 35% by incorporating a superplasticizer or a high-range water reducing agent in it. By controlling the water-cement ratio in the range of about 25% to about 35% various effects are obtained. Namely, a dense cement paste can be obtained, and the hardened concrete has a relatively high strength, reduced water permeability and reduced dry shrinkage.

As the superplasticizer, a sulfonic acid/formaldehyde high condensate such as β-naphthalenesulfonic acid/formaldehyde high condensate, melamine sulfonic acid/formaldehyde high condensate, lignin sulfonic acid/formaldehyde high condensate and their salts may be used in the present invention. Such a superplasticizer is sold by Kao K.K., Japan under the Japanese trademark "Mighty 150". The amount of the superplasticizer is generally about 0.25 to 0.6 wt. % (in terms of the solid) based on the cement. When this amount is less than about 0.25 wt. %, no sufficient water-reducing effect can be obtained and the water-cement ratio cannot be controlled to 35% or below. On the contrary, when it exceeds about 0.6 wt. %, segregation occurs easily and may cause troubles.

The flowing agent used in the present invention comprises a mixture of a sulfonic acid/formaldehyde high condensate and a polyvinyl alcohol. According to the present invention the sulfonic acid/formaldehyde high condensate may include the above-mentioned β-naphthalenesulfonic acid/formaldehyde high condensate, melamine sulfonic acid/formaldehyde high condensate and their salts. Such a flowing agent is sold by Kao K.K., Japan under the Japanese trademark "Mighty RD1-X". The mixture preferably includes about 1 to about 5 parts by weight of the polyvinyl alcohol per 100 parts by weight of the sulfonic acid/formaldehyde high condensate. When the amount of the polyvinyl alcohol is less than about 1 part by weight, concrete is fluidized rapidly causing a slump loss and thereby making the maintaining of the fluidizing effect hard. When it exceeds about 5 parts by weight, fluidizing effect cannot be obtained sufficiently. In the present invention, the flowing agent is generally used in an amount of about 0.25 to about 0.6 wt. % (in terms of the solid), preferably about 0.30 to 0.48 wt. % based on the cement. When it is less than about 0.25 wt. %, the intended high fluidity-maintaining effect cannot be obtained sufficiently and when it exceeds about 0.6 wt. %, the segregation of the constituent materials becomes serious and a normal state thereof cannot be recovered even by using a segregation-controlling agent which will be described below.

The segregation-controlling agent is used to control the segregation of the materials, particularly segregation of a coarse aggregate due to the addition of the flowing agent. A methylcellulose compound, preferably, a modified methylcellulose compound having an improved water solubility may be used as the segregation-controlling agent in the present invention. Such a methylcellulose compound is sold by Shinetsu Chemical K.K. under the Japanese trademark "Hi-Metolose".

Segregation-controlling agents comprising other cellulose compounds or polyethylene oxide compounds can be unsuitable since they may exhibit no sufficient effects. This agent is generally used in an amount in the range of about 0.02 to about 0.1 wt. % based on water used for the kneading. When it is less than about 0.02 wt. %, little effect of controlling the segregation of the materials can be obtained and, on the contrary, when it exceeds about 0.1 wt. %, water in the kneaded mixture changes into an agar-like form and the viscosity of the mixture is rapidly increased to make the kneading difficult.

The cement used in the present invention is not particularly limited and various cements such as ordinary Portland cement, Portland blast furnace slag cement, and fly ash cement may be used.

Further, in the present invention the aggregate is not particularly limited and sands, gravels, crushed stone pieces or artificial lightweight aggregate may be selected suitably depending on the use.

The flowing concrete according to the present invention may contain also conventional cement admixtures such as an air-entraining agent and a water-proofing agent as well as silica fume.

In the present invention, the concrete is prepared by kneading water, a cement, aggregate, superplasticizer and segregation-controlling agent together to form a base concrete having a slump of about 10 cm. Then, the flowing agent is added to the base concrete, which is thereafter fluidized by agitation, for instance, in the course of the transportation by means of a concrete truck agitator for forming a highly flowing concrete mixture ready for application.

The concrete which is prepared according to the present invention by using the suitably selected flowing agent and segregation-controlling agent maintains a high slump of at least 24 cm for longer than an hour and is sufficiently small in segregation of constituent materials such as aggregates. The hardened concrete has a relatively high strength.

Therefore, when the flowing concrete having the above-stated composition is poured in a building framework which has a complicated shape or in which reinforcing steels are arranged closely, the compaction is necessary only to a slight extent and concrete placement can be effected efficiently.

EXAMPLE 1

Water, cement, silica fume, fine aggregate, coarse aggregate, superplasticizer, air-entraining agent and segregation-controlling agent as specified in Table 1 were kneaded together in a composition given in it in a forced stirring type mixer for 1.5 to 2 min to obtain a concrete mixture having a slump of 8.5 to 11 cm. The amounts of the superplasticizer and air-entraining agent were those based on the cement. Then, a flowing agent was added to the concrete mixture in an amount shown in Table 1 and the concrete mixture was stirred in a drum mixer for 15 min to form a flowing concrete. The flowing agent was an aqueous solution of 30 wt. % of a mixture of β-naphthalenesulfonic acid/formaldehyde high condensate and polyvinyl alcohol, but in Tables 1 and 2 amounts thereof are given in terms of the solid. The slump of the concrete was measured immediately after the stirring and then at intervals of 30 min while it was left to stand.

The results are plotted in FIGS. 1 to 3, in which RDIX/C designates the ratio of the flowing agent over the cement and HMC/W represents the percentage of the segregation-controlling agent over water. FIGS. 1 to 3 illustrate concretes including the segregation-controlling agent in an amount of 0, 0.02 and 0.04 wt. % based on water respectively. It is apparent from these graphs that when 0.33 wt. % of the flowing agent was used, a fluidity represented by a slump of at least 23 cm can be maintained for about 1.5 hours.

In addition, the flowing concrete was taken immediately after the stirring to prepare a sample for determining compressive strength, of which results are given in Table 2. It is apparent from Table 2 that each concrete had a high compressive strength while its fluidity was high.

TABLE 1

| | |
|---|---|
| Water-cement ratio (%) | 29 |
| Content of fine aggregate (%) | 38 |
| Water*1 (Kg/m$^3$) | 145.6 |
| Cement*2 (Kg/m$^3$) | 502 |
| Silica fume*3 (Kg/m$^3$) | 50 |
| Fine aggregate*4 (Kg/m$^3$) | 589 |
| Coarse aggregate*5 (Kg/m$^3$) | 478 |
| Superplasticizer*6 (wt. %) | 0.366–0.504 |
| Air-entraining agent*7 (wt. %) | 0.075 |
| Segregation-controlling agent*8 (wt. %) | 0–0.04 |
| Flowing agent*9 (wt. %) | 0.18–0.48 |

*1 tap water.
*2 a cement for mass concrete sold by Daiich Cement K.K., Japan under the trade designation "Mascon Portland Blast Furnace Slag Cement B" and including 55 wt. % of slag and 45 wt. % of ordinary Portland cement.
*3 a silica fume sold by Nippon Keiso Kogyo K.K. under the trade designation "Nikke Powder" and having a specific gravity of 2.19.
*4 a product sold by Daiichi Concrete K.K., Japan and having an F.M. (fineness modulus) of 2.70, specific gravity of 2.58 and water absorption of 1.75%.
*5 Mesalite (an artificial lightweight aggregate) having an specific gravity of 1.28 (absolute dry) and a water absorption of 0.1%.
*6 a sodium salt of β-naphthalenesulfonic acid/formaldehyde high condensate produced and sold by Kao K.K., Japan under the Japanese trademark "Mighty 150".
*7 sodium avidinite produced and sold by Yamaso Chemical K.K., Japan under the Japanese trademark "Vinsol"
*8 a methylcellulose sold by Shinetsu Chemical K.K. under the Japanese trademark "Hi-Metolose" (90SH-30000) and having a viscosity of 17,000 to 28,000 as measured by Brookfield type viscometer in 2% aqueous solution at 20° C.
*9 a mixture of a β-naphthalenesulfonic acid/formaldehyde high condensate and polyvinyl alcohol and the mixture sold by Kao K.K., Japan under the Japanese trademark "Mighty RD1-X".

TABLE 2

| | Compressive Strength (Kg/cm$^2$) | | |
|---|---|---|---|
| | Segregation controlling agent (wt. %) | | |
| Flowing agent (wt. %) | 0 | 0.02 | 0.04 |
| 0.48 | 326 | 454 | 418 |
| 0.33 | 510 | 518 | 485 |
| 0.18 | 598 | 510 | 493 |

EXAMPLE 2

The segregation of the constituent materials of the flowing concrete used in Example 1 due to flow thereof was examined in a test device as shown in FIG. 4. The test device included a square-tubular concrete container 1, having an inner size 300 mm wide, 900 mm long and 1200 mm high, and a flow part 2 having a square flume shape and an inner size 300 wide, 3600 mm long and 300 mm high, the flow part 2 communicated at its one end to the bottom of the concrete container 1. The test device had five ports 5 at intervals of 1 m for taking out specimens, the ports being normally closed. A box 300 mm wide, 450 mm long and 1200 mm high was placed in the container 1 to define a concrete receiving space as shown in FIG. 4. A flowing concrete 4 was placed in the concrete receiving space to a height of 1000 mm. Then, the box 3 was raised to allow the concrete mixture 4 to flow by gravity into the flow part 2. Thereafter, a predetermined amount of a specimen of the concrete mixture 4 was taken out from each of the ports 4 and then washed with water for determining the amount of the coarse aggregate contained in it. The amount of the coarse aggregate varies depending on the composition of flowing concretes. The dispersion of the amount of the coarse aggregate defined by the following formula was determined for each concrete mixture:

$$\frac{M_1 - M_2}{M_1 + M_2} \times 100(\%)$$

wherein $M_1$ and $M_2$ represent the maximum weight and the minimum weight of the coarse aggregate among the five specimens, respectively. Changes in the dispersion depending on the amounts of the flowing agent and the segregation-controlling agent were examined.

Figure 5:
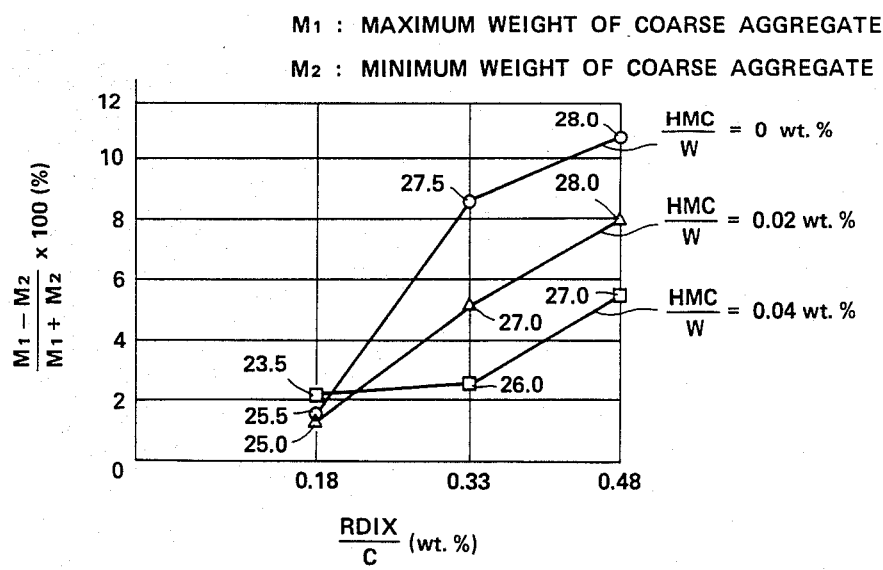
FIG. 5 is a graph showing the results of segregation tests in Example 2.

The results are plotted in FIG. 5, in which slump of each specimen is given at its specific point. It is apparent from this graph that the segregation can be controlled by using the segregation-controlling agent, and that when it was used in an amount of 0.02 wt. % or more, the segregation of the constituent materials could be controlled to an acceptable degree even when the flowing agent was used in an amount near the upper limit (0.6 wt. %).

What is claimed is:

1. A process of producing a flowing concrete, comprising the steps of:
   (a) kneading a cement, water, aggregates, a superplasticizer and a segregation-controlling agent into a base concrete having a water-cement ratio of about 25 to about 35%, the segregation-controlling agent contained in an amount of about 0.02 to about 0.1 wt. %, based on the water and including a methylcellulose compound, and the superplasticizer contained in an amount of about 0.25 to about 0.6 wt. % based on the cement;
   then, (b) adding about 0.25 to about 0.6 wt. %, in terms of the solid, of a flowing agent based on the cement to the base concrete, the flowing agent including a sulfonic acid/formaldehyde high condensate and a polyvinyl alcohol; and
   further (c) kneading the base concrete with the flowing agent into the flowing concrete.

2. A process as recited in claim 1, wherein the flowing concrete just after kneaded in the step (a) has a slump of about 10 cm.

3. A process as recited in claim 2, wherein the sulfonic acid/formaldehyde high condensate comprises at least one of a $\beta$-naphthalenesulfonic acid/formaldehyde high condensate, melamine sulfonic acid/formaldehyde high condensate and their salts.

4. A process as recited in claim 3, wherein the flowing agent comprises 100 parts by weight of the sulfonic acid/formaldehyde high condensate and about 1 to about 5 parts by weight of the polyvinyl alcohol.

5. A process as recited in claim 4, wherein the methylcellulose compound comprises a modified methylcellulose compound.

6. A flowing concrete prepared by the process of claim 1, 2, 3, 4 or 5.

* * * * *